US008676998B2

(12) United States Patent
Schneider

(10) Patent No.: US 8,676,998 B2
(45) Date of Patent: Mar. 18, 2014

(54) REVERSE NETWORK AUTHENTICATION FOR NONSTANDARD THREAT PROFILES

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 555 days.

(21) Appl. No.: 11/947,446

(22) Filed: Nov. 29, 2007

(65) Prior Publication Data
US 2009/0144436 A1  Jun. 4, 2009

(51) Int. Cl.
*G06F 15/16* (2006.01)

(52) U.S. Cl.
USPC ........... 709/229; 713/161; 713/159; 713/170; 713/160; 713/176; 713/178; 713/181; 713/166; 713/168; 713/182; 713/169; 713/156; 713/157; 705/51; 705/64; 705/67; 705/57; 705/59; 709/225; 709/228; 709/227; 709/220; 709/223; 726/14; 726/15; 726/25; 726/4; 726/5; 726/17; 726/18; 726/2; 726/27; 380/278; 380/283; 380/255; 380/28; 380/282; 380/44; 380/277; 380/30; 455/410; 455/411; 715/864

(58) Field of Classification Search
USPC ......................................................... 709/229
See application file for complete search history.

(56) References Cited

U.S. PATENT DOCUMENTS

| 6,058,476 | A * | 5/2000 | Matsuzaki et al. ............. 713/169 |
|---|---|---|---|
| 7,203,837 | B2 * | 4/2007 | O'Shea et al. ................ 713/170 |
| 7,650,416 | B2 * | 1/2010 | Wu et al. ........................ 709/228 |
| 7,869,591 | B1 * | 1/2011 | Nagel et al. ...................... 380/28 |
| 8,028,329 | B2 * | 9/2011 | Whitcomb ........................ 726/5 |
| 8,239,677 | B2 * | 8/2012 | Colson ............................ 713/166 |
| 2002/0023164 | A1 * | 2/2002 | Lahr ................................ 709/231 |
| 2002/0023208 | A1 * | 2/2002 | Jancula ............................ 713/156 |
| 2002/0152384 | A1 * | 10/2002 | Shelest et al. ................. 713/176 |
| 2002/0178271 | A1 * | 11/2002 | Graham et al. ................. 709/229 |
| 2002/0188562 | A1 * | 12/2002 | Igarashi et al. ................. 705/40 |
| 2002/0197979 | A1 * | 12/2002 | Vanderveen .................... 455/410 |
| 2004/0073801 | A1 * | 4/2004 | Kalogridis et al. ............. 713/176 |
| 2004/0088348 | A1 * | 5/2004 | Yeager et al. ................. 709/202 |
| 2004/0088386 | A1 * | 5/2004 | Aggarwal ....................... 709/220 |
| 2004/0117623 | A1 * | 6/2004 | Kalogridis et al. ........... 713/165 |
| 2004/0243801 | A1 * | 12/2004 | Chen et al. ..................... 713/160 |
| 2004/0268121 | A1 * | 12/2004 | Shelest et al. ................. 713/156 |
| 2005/0177515 | A1 * | 8/2005 | Kalavade et al. ............... 705/52 |
| 2005/0188077 | A1 * | 8/2005 | Quintanilla et al. .......... 709/224 |
| 2005/0210251 | A1 * | 9/2005 | Nyberg et al. ................. 713/169 |
| 2005/0251856 | A1 * | 11/2005 | Araujo et al. ................... 726/12 |
| 2006/0059344 | A1 * | 3/2006 | Mononen ....................... 713/171 |
| 2006/0101149 | A1 * | 5/2006 | Deininger et al. ............. 709/227 |
| 2006/0101510 | A1 * | 5/2006 | Kadyk et al. .................... 726/12 |
| 2006/0224897 | A1 * | 10/2006 | Kikuchi et al. ............... 713/182 |

(Continued)

OTHER PUBLICATIONS

Goffee, "Greenpass Client Tools for Delegated Authorization in Wireless Networks", Dartmouth College, Jun. 2004.*

(Continued)

*Primary Examiner* — Krista Zele
*Assistant Examiner* — Ondrej Vostel
(74) *Attorney, Agent, or Firm* — Lowenstein Sandler LLP

(57) ABSTRACT

A client-server communication protocol permits the server to authenticate the client without requiring the client to authenticate the server. After establishing the half-authenticated connection, the client transmits a request and the server performs or responds accordingly. A network management system and environment where this protocol can be used is also described and claimed.

21 Claims, 6 Drawing Sheets

(56) References Cited

U.S. PATENT DOCUMENTS

| | | | | |
|---|---|---|---|---|
| 2006/0282662 | A1* | 12/2006 | Whitcomb | 713/156 |
| 2007/0067629 | A1* | 3/2007 | Mackenzie et al. | 713/168 |
| 2007/0070976 | A1* | 3/2007 | Mussman et al. | 370/351 |
| 2007/0083766 | A1* | 4/2007 | Farnham et al. | 713/176 |
| 2007/0086345 | A1* | 4/2007 | Yashima et al. | 370/236 |
| 2007/0287424 | A1* | 12/2007 | Park | 455/411 |
| 2008/0200147 | A1* | 8/2008 | Nylander et al. | 455/411 |
| 2008/0320307 | A1* | 12/2008 | Zhang et al. | 713/170 |
| 2009/0031042 | A1* | 1/2009 | Phatak | 709/245 |
| 2010/0223460 | A1* | 9/2010 | Blokzijl et al. | 713/157 |

OTHER PUBLICATIONS

Oracle Corporation, "Oracle Advanced Security Administrator's Guide Release 8.1.7", copyright 1996-2000.*

Danisch, "The Exponential Security System TESS: An Identity-Based Cryptographic Protocol for Authenticated Key-Exchange (E.I.S.S.—Report Apr. 1995)", Aug. 1995.*

Catalano et al., "IPAKE: Isomophisms for Password-Based Authenticated Key Exchange", 2004.*

Granzer et al., "Communication Services for Secure Building Automation Networks", 2010.*

Bresson et al., "Proofs of Security for Password-Based Key Exchange (IEEE P1363 AuthA Protocol and Extensions)".*

Adams, "The Simple Public-Key GSS-API Mechamism (SPKM)", 1996.*

Funny, "Key Management Techniques", 1998.*

Kemp, "The Public Key Login Protocol <draft-kemp-auth-pklogin-01.txt>", 1996.*

Bhakti et al., "EAP-based Authentication with EAP Method Selection Mechanism", 2007.*

Feldhofer, "An Authentication Protocol in a Security Layer for RFID Smart Tags", 2004.*

Blake-Wilson et al., "Transport Layer Security (TLS) Extensions", RFC 4366, 2006.*

Dierks et al., "The Transport Layer Security (TLS) Protocol Versions 1.1", RFC 4346, 2006.*

Zuccherato et al., "ISO/IEC 9798-3 Authentication SASL Mechanism", RFC 3163, 2001.*

Eisler, LIPKEY—A Low Infrastructure Public Key Mechanism Using SPKM', RCF 2847, 2000.*

Viet et al., "Anonymous Password-Based Authenticated Key Exchange", 2005.*

Yasinsac et al., Analyzing Internet Security Protocols', 2001.*

Gollman, "What do we mean by Entity Authentication", 1996.*

Lecture, "Introduction to Cryptography CS 355", 2005.*

* cited by examiner

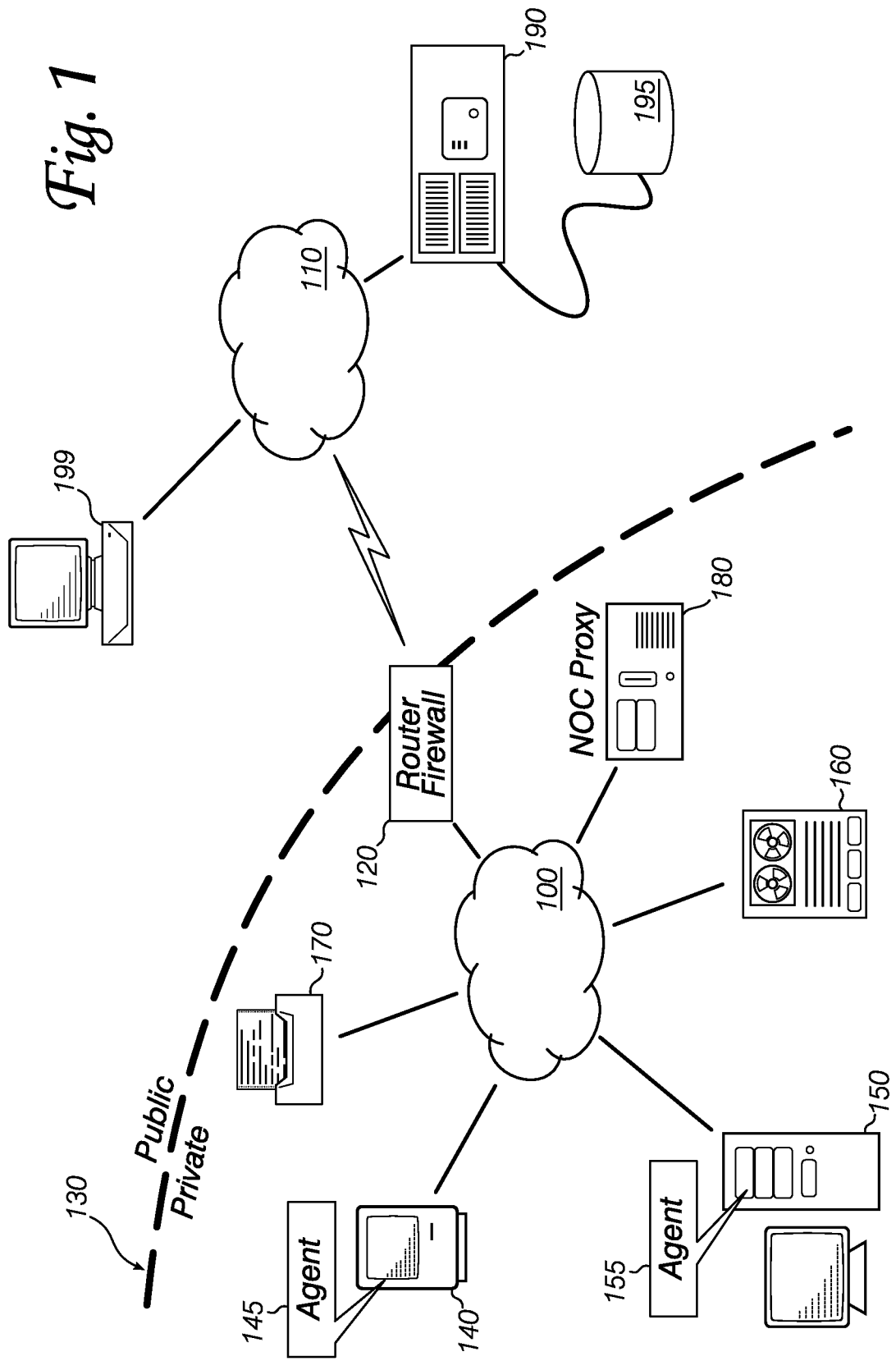

REVERSE NETWORK AUTHENTICATION FOR NONSTANDARD THREAT PROFILES

FIELD

The invention relates to network security and authentication. In particular, embodiments of the invention address security requirements in nonstandard client-server interactions.

BACKGROUND

Many computer-implemented applications and processes depend on cooperation between two or more computers, which communicate via a point-to-point or point-to-multipoint data network, or a distributed network of point-to-point and point-to-multipoint segments interconnected by routers and bridges. Computer interactions are often separated into two general classes, client-server and peer-to-peer, though those classes are not distinguished in the Open Systems Interconnection Basic Reference Model ("OSI Model"), a seven-layered, abstract description of the hardware, firmware and software that make distributed data processing systems possible.

In common usage, a client-server application is one where a first computer (the client) seeks out, connects to, and requests a service of a second computer (the server). Clients are often smaller or less capable machines with fewer resources, while servers are typically larger, faster and better connected, in keeping with their responsibility to provide services to many requesting clients. In a peer-to-peer system, participating computers may be of varying capabilities, and their interactions tend to further a common goal of benefit to both (or all) of the machines. Both client-server and peer-to-peer applications use the same sorts of communication facilities, which can all be localized to one level or another of the OSI model, but it is important to recognize that the different interaction profiles place different demands on the communication infrastructure, and influence network protocol design in different ways.

Security and authentication are two areas where the needs of client-server and peer-to-peer applications diverge. Of course, many applications, of both classes, can do without any sort of security or authentication (consider, for example, the great value of ordinary web servers, which serve anonymous clients and need no protection against eavesdropping). However, participants in a peer-to-peer network may wish to shield their interactions from snooping, or to enforce fairness among themselves. Similarly, some clients of some web servers may wish to establish the servers' identities with certainty and keep their interactions confidential. For example, a user of an online banking service may be concerned about an impostor server collecting his account details and password, and may not care to have his bank statement transmitted in plaintext over a wireless connection.

The protocols and techniques developed to address these (and other) situations can share certain implementation details, but the variety of different protocols in active use attests to the difficulty of designing a one-size-fits-all protocol. Indeed, even flexible, extensible protocols often fail to support certain niche applications. In these cases, a new extension (or even a new protocol) may be required.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

FIG. 1 shows a network management system where an embodiment of the invention is used in communication between devices.

DETAILED DESCRIPTION

Figures 2A, 2B:
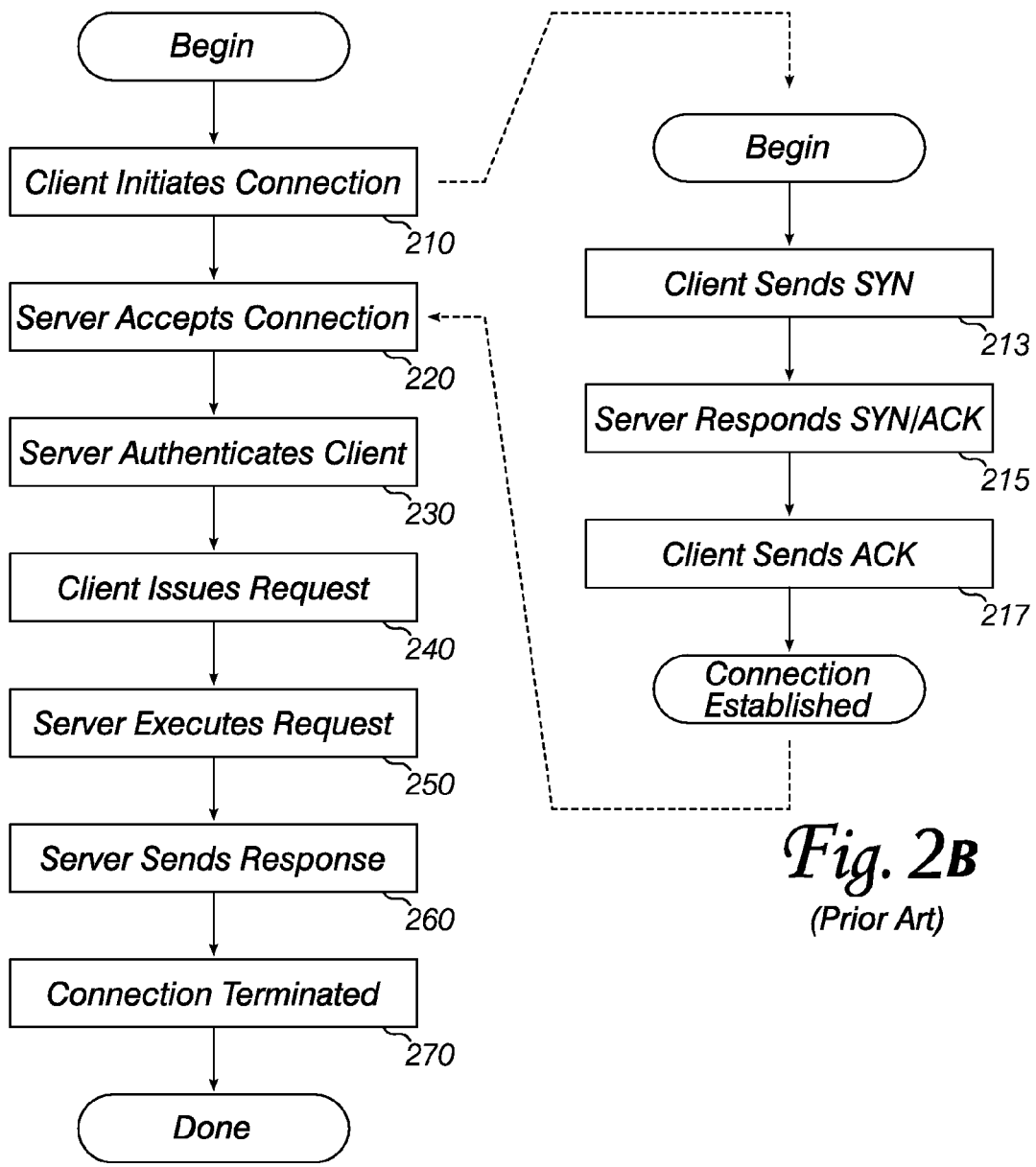
FIG. 2A outlines the client-server protocol of an embodiment of the invention.
FIG. 2B shows a detail of client-server Transmission Control Protocol ("TCP") connection establishment.

Embodiments of the invention provide assurances about identity, and optionally about confidentiality, between a client and a server interacting over a data communication network. In contrast to existing systems, it is the server which must authenticate the client, rather than the reverse. A practical system where this feature is critical is described, and other possible applications are discussed.

FIG. 1 shows a distributed computing environment where an embodiment of the invention solves a security problem. A first data network 100 is kept separate from a second network 110 by a router/firewall device 120. Network 100 may be, for example, a private local area network ("LAN") of a corporation or university, while network 110 may be a public distributed data network such as the Internet. Dashed boundary 130 indicates how the overall network environment is divided into "public" and "private" portions by router/firewall 120. On the private side of boundary 130, a number of computers and other resources are depicted: desktop computers 140 and 150; mainframe 160; and printer 170. Also present is a computer 180 labeled "NOC Proxy" ("NOC" stands for "Network Operations Center"). NOC Proxy's function is discussed below.

Those responsible for the management of the network and resources on the private side of boundary 130 have chosen to outsource network monitoring and administration tasks to a service company, which maintains a network management server 190 and an associated database 195 at a remote location to facilitate those tasks. That is, computer 190 collects information about network 100 and resources 140-170, stores the information in database 195, and may present the information to an authorized user accessing the system from computer system 199. (Information about network 100 may also be accessible from computers within the private domain.)

Router/firewall 120 may restrict data traffic flowing into and out of the private domain, which may impair the ability of network management server 190 to collect the information it needs to monitor and administer the private network. Since there may be hundreds or thousands of computers and other resources to managed, it is impractical to configure router/firewall 120 to permit access between system 190 and each resource. Therefore, in the environment shown here, NOC Proxy 180 is deployed to serve as a representative of management server 190. Since NOC Proxy 180 operates within boundary 130, it has relatively free access to other computers and resources protected by router/firewall 120. With this arrangement, router/firewall 120 need only be configured to permit NOC Proxy 180 to communicate with network management server 190. When management server 190 needs information (or when an authorized user directs the management server to make a change to a managed system), it contacts NOC proxy 180 to obtain the data or issue the command. One commercially-available network management service that operates along the lines described here is Command Center, available from Red Hat Corporation of Raleigh, N.C. In Command Center, NOC Proxy 180 is called a "Scout."

Embodiments of the invention operate between NOC Proxy 180 and some internal devices with which proxy 180 communicates. Recall that NOC Proxy 180 collects information from managed systems and issues commands to them, at the direction of network management server 190. Various protocols may be used for these interactions. For example, printer 170 may respond to Simple Network Management Protocol ("SNMP") requests. Mainframe 160 may respond to Intelligent Platform Management Interface ("IPMI") requests, and a database or web server executing at mainframe 160 may respond to requests appropriate for those services (i.e., Structured Query Language queries, or Hypertext Transfer Protocol requests).

There is no widely-accepted protocol for monitoring and managing personal computers ("PCs") such as 140 and 150. SNMP or IPMI could be used, but these may be unnecessarily complex for many management targets and purposes. Also, some information of interest to a network management system may be unavailable through such interfaces. (For example, the Microsoft Exchange electronic mail server no longer provides data via SNMP.) Thus, an embodiment of the invention may be a software module installed at a PC (for example, agent 145 at computer 140, or agent 155 at computer 150). These agents receive requests from NOC Proxy 180 and respond by collecting and delivering status information or performing state changes (e.g., rebooting or powering off). In this application, a simpler protocol may provide adequate functionality, and be easier to implement and maintain. For example, the Hypertext Transfer Protocol ("HTTP") has been adapted for use in the Command Center system.

Two concerns complicate the design and implementation of the NOC proxy-to-managed computer protocol. First, it may be important for a managed computer to authenticate the NOC proxy, so that an impostor or attacker is not granted easy access to system information, or the ability to change the system's state. Second, in some environments, it may be desired to protect proxy-to-target communications from eavesdroppers. Both concerns can be addressed by using the Secure Sockets Layer, SSL, in connection with the basic protocol (e.g., HTTP, as discussed above). However, this implementation raises problems of its own: because the NOC proxy acts as a client to the PC agent's server, the normal allocation of roles in SSL requires each agent to be provisioned with a server certificate if the agent is to authenticate the NOC proxy. Standard implementations of SSL do not offer client authentication without first performing server authentication. And, although the private network shown in FIG. 1 only has two desktop computers, a real network may have hundreds or thousands of such machines. Providing server certificates to each machine may be expensive or time-consuming. Furthermore, the certificates provide very little value to the overall system operation. Consequently, an alternate arrangement is called for.

FIG. 2A outlines a protocol according to an embodiment of the invention. The client-server interaction begins when a client initiates a data connection to the server (210). The server accepts the connection (220). At this point, for many connection types, either party can send data to the other. Next, the server authenticates the client (230). If the authentication is unsuccessful, the server may terminate the connection (not shown). After authentication, the client issues a request (240) by transmitting the request over the data connection. The server executes the request (250) and sends a response (260). The client-server interaction is completed, so the connection is terminated (270).

Any sort of data connection could be used to carry data between the client and server in the protocol outlined above. One commonly-used data connection is a Transmission Control Protocol ("TCP") connection. As is known in the art, such a connection is established by the "three-way handshake" illustrated in FIG. 2B: the client sends a data packet containing a SYN (Synchronize) flag (213). The server responds with a data packet containing both SYN and ACK (Acknowledge) flags (215). Finally, the client sends a packet with the ACK flag set (217), and the TCP connection is ready to carry application data between the client and server. From an application perspective, this handshake is taken care of by low-level protocol handling software. A client may simply call one subroutine (e.g., connect ( )), and upon a successful return from that subroutine, the client will be in communication with the server. For the server's part, a corresponding subroutine call, accept ( ), handles the server's share of the three-way handshake, and upon a successful return from accept ( ), the server will be in communication with the client. Once a connection is established, there may be little or no difference between the "client" and "server" ends of the connection, but the distinction is still important for the successful conduct of a subsequent protocol. As an analogy, consider a telephone connection. After the called party picks up the phone, either party could speak and be heard by the other. But by convention, the called party says "Hello?" If he simply remained silent, the caller might assume the connection was bad. Similarly, if the caller immediately inquired "Hello?" (as if he was the called party) the conversation might not proceed as smoothly.

Figure 2C:
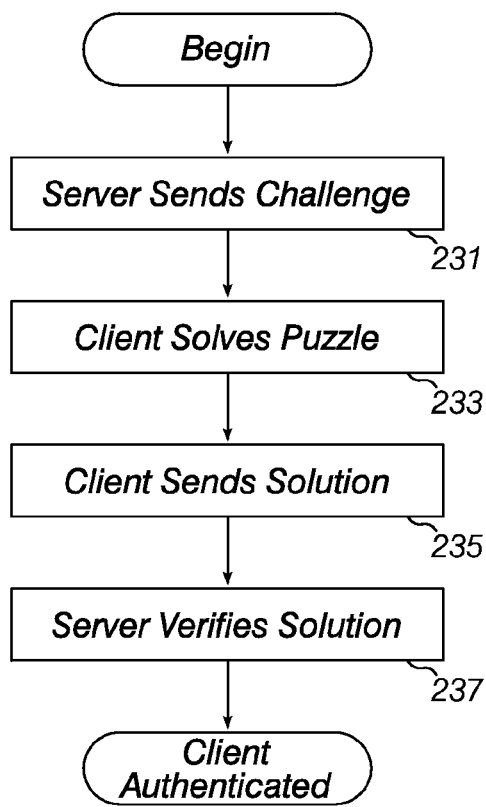
FIG. 2C shows a detail of the client-authentication portion of the inventive protocol.

FIG. 2C expands on a portion of the protocol shown in FIG. 2A at 230, where the server authenticates the client. This can be accomplished if the server sends a challenge to the client (231). A challenge may be a mathematical or cryptographic "puzzle" that can only be solved efficiently if the client knows a secret number or key. An impostor that does not have the key could not solve the puzzle, or would have to perform a time-consuming exhaustive search for the solution. A proper client, however, knows the secret, so it solves the puzzle easily (233). The solution is sent back to the server (235), where it is verified (237). This sequence allows the server to authenticate the client.

Figure 2D:
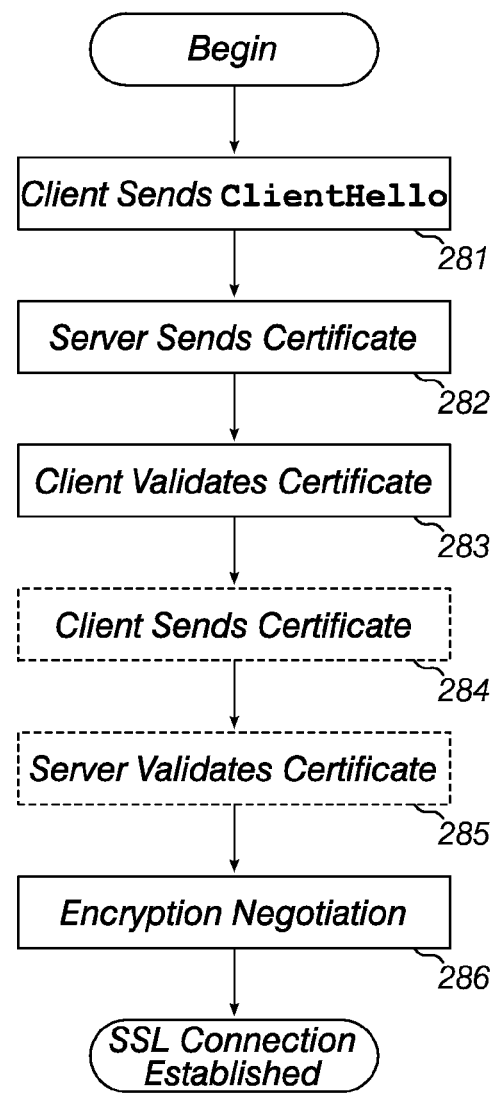
FIG. 2D shows how a prior-art protocol functions.

FIG. 2D outlines a similar interaction that occurs between a client and a server as they establish an ordinary SSL connection. The interaction begins when the client sends a message called ClientHello (281). This message could be sent at any time when the server would not be confused by it, but conventionally the client sends the message immediately after a data connection (e.g., a TCP connection) is established. The server responds by sending a certificate (282). A certificate is a data structure containing information that is intrinsically tamper-resistant (i.e., if any accidental or malicious changes are made to the information, the modification is immediately apparent), and also extrinsically verifiable by reference to non-secret information. For example, a certificate may contain a tamper-resistant identification of the server and be signed by a trusted authority's private key. The client can validate the certificate (283) by obtaining the trusted authority's public key and checking the signature.

After the client validates the server's certificate, it may send a similar certificate identifying itself (284). If such a client certificate is sent, the server validates it (285) using an analogous procedure. Client validation is optional in SSL. Other features of the SSL protocol, such as encryption algorithms and session keys, are negotiated (286), and a secure, authenticated connection is established.

Note that the protocol outlined in FIG. 2D requires the server to send its certificate before the client can be authenticated. Indeed, the Internet Engineering Task Force ("IETF") Request for Comments ("RFC") document defining the SSL protocol (more generally known as Transport Layer Security, "TLS"), states:

TLS supports three authentication modes: authentication of both parties, server authentication with an unauthenticated client, and total anonymity. Whenever the server is authenticated, the channel is secure against man-in-the-middle attacks, but completely anonymous sessions are inherently vulnerable to such attacks. Anonymous servers cannot authenticate clients.

RFC 4346, Appendix F.1.1, April 2006, emphasis added.

In other words, the SSL/TLS protocol is incapable of achieving the client-only authentication of an embodiment of the invention. However, since the SSL protocol involves many similar concerns, since the standard provides for extensions, and since source-code implementations are available, SSL can serve as a good foundation upon which to construct the inventive protocol. One implementation is outlined in FIG. 2E: after the client sends its ClientHello message (281), the server and client complete an anonymous key exchange (292). This results in the secure and totally anonymous connection mentioned in RFC 4346. Next, the client sends a certificate (294), and the server validates it (296). These operations are analogous to the challenge/puzzle/solution sequence discussed in reference to FIG. 2C. The challenge is implicit in this case: the client's certificate contains tamper-resistant, verifiable information to show that it possesses the secret information.

Other encryption negotiation may follow (286), as in traditional SSL connection establishment. At the end of this interaction, a secure connection exists, and the server has authenticated the client, without the client having first authenticated the server.

Figure 2E:
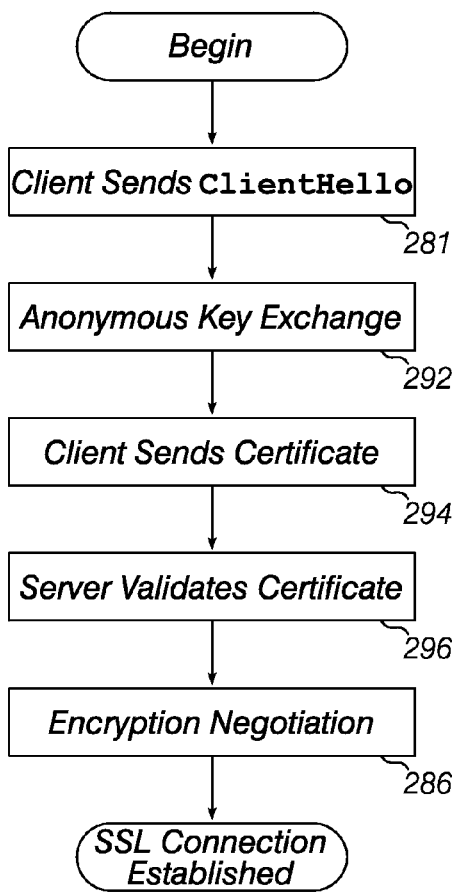
FIG. 2E shows how a Secure Sockets Layer ("SSL") protocol can be modified according to an embodiment of the invention.
Figure 2F:
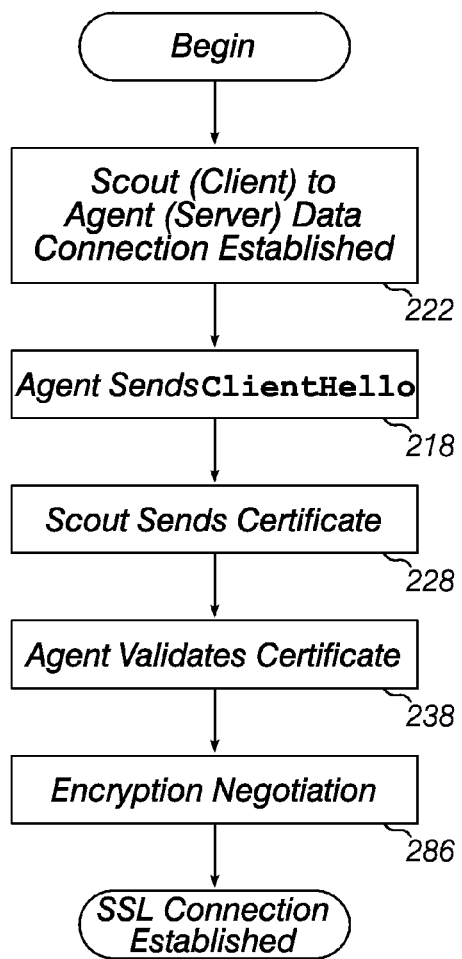
FIG. 2F shows another way SSL can be adapted to function as desired.

FIG. 2F shows another way an embodiment of the invention can be implemented based on TLS/SSL. Here, the standard protocol is reversed between client and server. This is like the caller on a telephone call inquiring "Hello?" as soon as the called party picks up the line, but if the called party expects this, the conversation will not be impaired.

As in all the other protocols, a bidirectional data connection is first established between the NOC proxy (Scout, client) and the PC agent (server) (222). This may be a TCP connection or a connection according to some other low-level protocol. Next, the agent (or server, in TLS terminology—the party that accepted the connection, rather than the party that initiated it) sends a ClientHello message (218). The NOC proxy (Scout, client) sends its certificate (228), and the agent validates it (238). After the usual encryption negotiation (286), the remainder of the inventive protocol can occur as shown in FIG. 2A, steps 240-270.

The general procedure shown in FIG. 2C and the two specific embodiments described in relation to FIGS. 2E and 2F establish a half-authenticated connection between a client and a server. The authentication applies to the client rather than to the server. In other words, the server can be sure of the client's identity, but the client may not have confidence in the server's identity. This situation is adequate for applications like the one described with reference to FIG. 1, and the elimination of certificate production and distribution costs (which would otherwise be incurred to give each desktop computer agent its own server certificate) make an embodiment of the invention superior to going without authentication or using prior-art SSL/TLS to obtain bilateral authentication.

Figure 3:
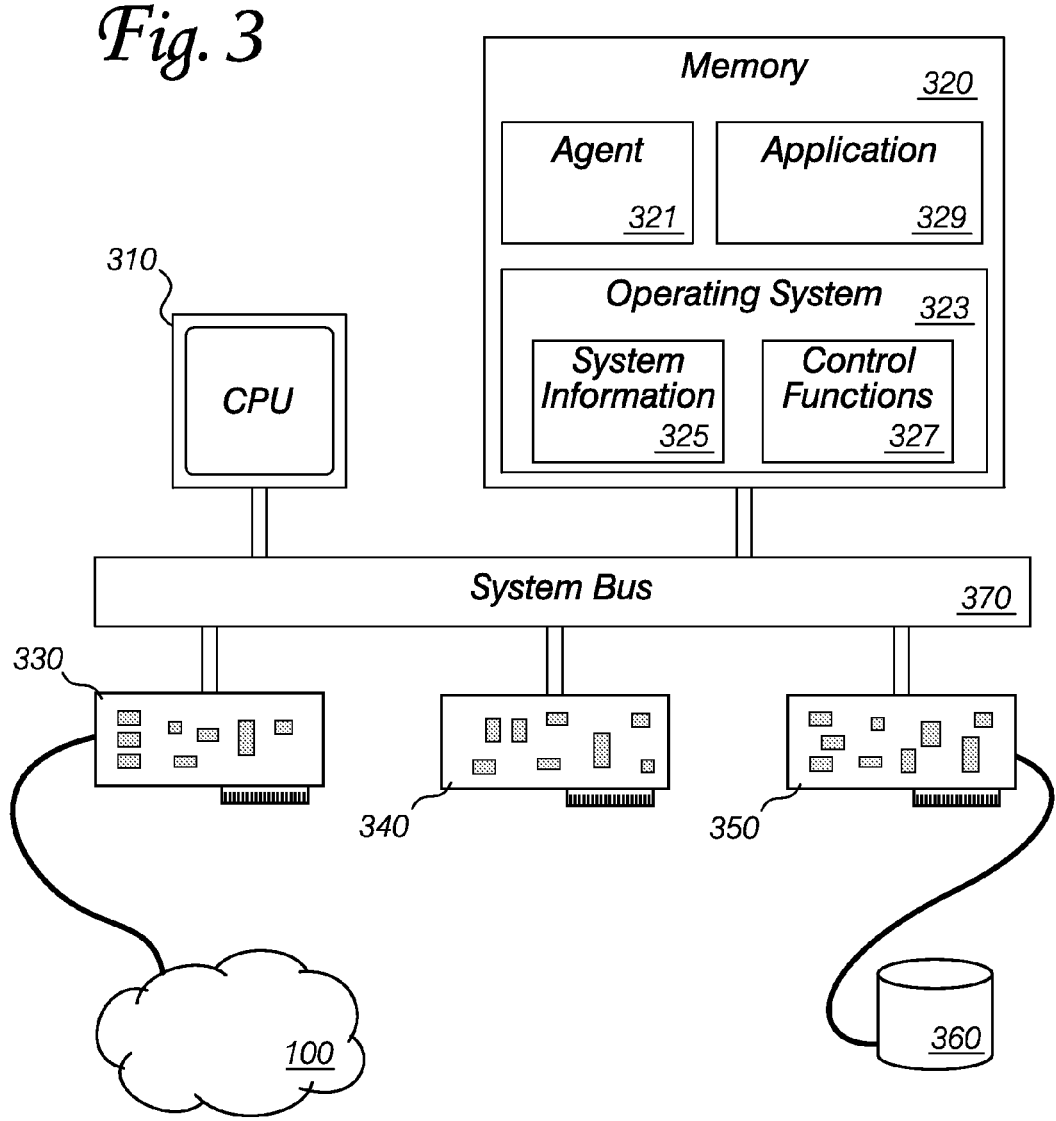
FIG. 3 shows some components and subsystems of a computer that supports an embodiment of the invention.

FIG. 3 shows some subsystems and components of a computer that implements an embodiment of the invention. Either the "client" side of the protocol or the "server" side of the protocol may be supported. In some environments, a single computer may act as a client in some interactions, and as a server in others. Element 310 is a programmable processor (central processing unit or "CPU") that executes instructions stored in memory 320 to perform operations as described above. Instructions in memory 320 may be grouped into applications, libraries, drivers, and so on; several such groups are identified in this Figure. An agent 321 is the principal embodiment of the invention shown in this system: it coordinates the establishment of the half-authenticated connection with a NOC proxy. Once such a connection is established, the NOC proxy sends a request and the agent responds appropriately. For example, the NOC proxy may request system information 325, which agent 321 retrieves from operating system 323. Examples of system information include the system uptime (how long the system has been operating), the load average (an estimate of how busy the system is), and resource availability (free memory, free disk space, etc.) The request may seek hardware information, so the agent may obtain and return information about CPU 310 (e.g., its identification, clock speed, or supported feature set); memory 320 (size and speed); network interface 330 (Media Access Control ("MAC") address, type, speed); or hard disk 360 (manufacturer, speed, capacity). The NOC proxy may also send a request that causes the system to change its state, by resetting, rebooting, or shutting down.

Other system components depicted in FIG. 3 include a video adapter 340 and a mass storage adapter 350. These components exchange data and control signals via system bus 370.

Operating system 323 typically manages the various hardware and software resources of the system and allocates them fairly among uses. Desktop computers often use an operating system such as Windows™ from Microsoft Corporation of Redmond, Wash.; Mac OS® from Apple Incorporated of Cupertino, Calif., or Red Hat Linux® from Red Hat Corporation of Raleigh, N.C.

An embodiment of the invention may be a machine-readable medium having stored thereon data and instructions (software) to cause a programmable processor to perform operations as described above. In other embodiments, the operations might be performed by specific hardware components that contain hardwired logic. Those operations might alternatively be performed by any combination of programmed computer components and custom hardware components.

Figure 4:
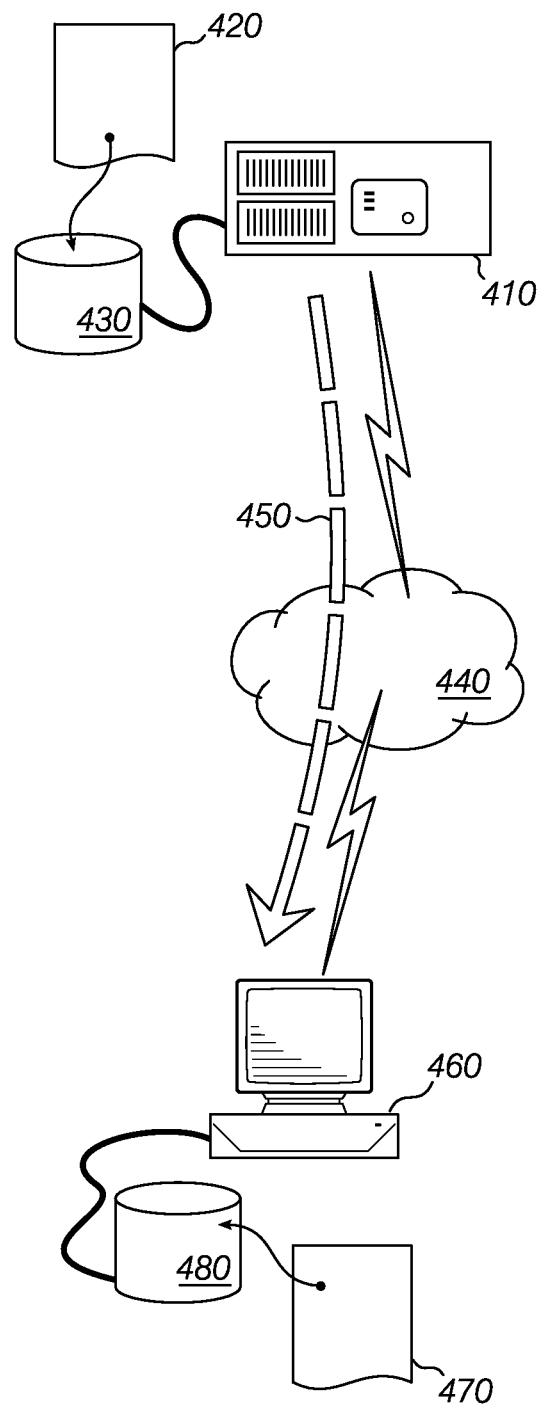
FIG. 4 shows how an embodiment of the invention can be transmitted from one place to another.

In one embodiment, data and instructions to implement the methods described above may be transmitted from one computer system to another via a distributed data network. This is shown in FIG. 4: a first computer system 410 has a copy of the software 420 stored on a mass storage device 430. In response to a request from computer 460, computer 410 modulates a carrier signal to encode data and instructions 420 and transmits the modulated signal to computer 460 over a distributed data network 440 such as the Internet. (Transmission indicated in this figure by dashed arrow 450). When computer 460 receives the modulated signal, it extracts the data and instructions and stores them as a file 470 on a local mass storage device 480. The encoding and transmission of data and instructions is commonly called "serving" the data and instructions, while requesting and receiving is commonly called "downloading." Computer 460 downloads the contents of document 420 and stores them as document 470, giving rise to another embodiment of the invention: mass storage device 480 is a machine-readable medium storing instructions to cause a programmable processor (in computer 460, but not shown in FIG. 4) to perform operations described. If computer 460 executes those instructions, it may perform a method according to another embodiment.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the foregoing description, numerous details were set forth. It will be apparent, however, to one skilled in the art, that the present invention may be practiced without these specific details. In some instances, well-known structures and devices were shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "sending," "receiving," "attaching," "forwarding," "caching," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention was not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.); and a machine (e.g, computer) readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that half-authenticated, secure data connections between a client and server can also be negotiated and used by software and hardware that distribute the functions of embodiments of this invention differently than herein described. Such variations and implementations are understood to be captured according to the following claims.

I claim:

1. A method comprising:
   deploying a proxy to serve as a representative of a management server, wherein the serve as the representative comprises collecting information to monitor and administer a private network, wherein the private network is a private domain;
   managing certificate production and distribution costs of the management server by establishing a half-authenticated data connection between the proxy and the management server using a client certificate, wherein the establishing comprises:
   receiving, by the management server, the client certificate from the proxy for authenticating the proxy, without the proxy authenticating the management server;
   validating, by the management server, the client certificate to authenticate the proxy, the validation of the client certificate comprising validating a cryptographic challenge of a certificate authority by obtaining a public key of the certificate authority and checking a signature associated with the public key;

creating, by the management server, the half-authenticated data connection with the proxy in response to a successful validation of the client certificate; and communicating data between the proxy and the management server over the half-authenticated data connection in response to a successful validation of the client certificate.

2. The method of claim 1, wherein establishing the half-authenticated data connection further comprising:

establishing a bidirectional data connection according to a low-level protocol from a client to the management server;

commencing a reversed Secure Sockets Layer ("SSL") protocol negotiation, wherein the management server takes a role according to an SSL client and the client takes a role according to an SSL server;

transmitting a certificate from the client to the management server in the reversed SSL protocol negotiation; and completing the reversed SSL protocol negotiation.

3. The method of claim 1, wherein communicating comprises transmitting a request from a client to the management server, the request is to obtain system information including at least one of a system uptime, a system load average, a system free memory, a system network utilization, or a system disk utilization.

4. The method of claim 3 wherein the request is to obtain system hardware characteristic including at least one of an installed processor identification, an installed memory size, a network hardware identifier, or a disk identifier.

5. The method of claim 3, wherein the request is to change a status of the management server including one of a system reset or a system shutdown.

6. The method of claim 1, wherein the half-authentication data connection comprises an anonymous data connection between a client and the management server in which at least the server remains anonymous and cannot authenticate the client.

7. The method of claim 1, further comprising terminating the half-authenticated data connection between a client and the management server once the data has been communicated.

8. A non-transitory computer-readable storage medium containing data and instructions to cause a hardware processor to execute operations comprising:

deploying, by the hardware processor, a proxy to serve as a representative of a management server, wherein the serve as the representative comprises collecting information to monitor and administer a private network, wherein the private network is a private domain;

managing certificate production and distribution costs of the management server by establishing a half-authenticated data connection between the proxy and the management server using a client certificate, wherein the establishing comprises:

receiving, by the management server, the client certificate from the proxy for authenticating the proxy, without the proxy authenticating the management server;

validating, by the management server, the client certificate to authenticate the proxy, the validation of the client certificate comprising validating a cryptographic challenge of a certificate authority by obtaining a public key of the certificate authority and checking a signature associated with the public key;

creating, by the management server, the half-authenticated data connection with the proxy in response to a successful validation of the client certificate; and communicating data between the proxy and the management server over the half-authenticated data connection in response to a successful validation of the client certificate.

9. The non-transitory computer-readable storage medium of claim 8, further comprising:

establishing a bidirectional data connection according to a low-level protocol from a client to the management server;

commencing a reversed Secure Sockets Layer ("SSL") protocol negotiation, wherein the management server takes a role according to an SSL client and the client takes a role according to an SSL server;

transmitting the certificate from the client to the management server in the reversed SSL protocol negotiation; and completing the reversed SSL protocol negotiation.

10. The non-transitory computer-readable storage medium of claim 8, wherein communicating comprises transmitting a request from a client to the management server, the request is to obtain system information including at least one of a system uptime, a system load average, a system free memory, a system network utilization, or a system disk utilization.

11. The non-transitory computer-readable storage medium of claim 10, wherein the request is to obtain system hardware characteristic including at least one of an installed processor identification, an installed memory size, a network hardware identifier, or a disk identifier.

12. The non-transitory computer-readable storage medium of claim 10, wherein the request is to change a status of the management server including one of a system reset or a system shutdown.

13. The non-transitory computer-readable storage medium of claim 8, wherein the half-authentication data connection comprises an anonymous data connection between a client and the management server in which at least the management server remains anonymous.

14. The non-transitory computer-readable storage medium of claim 8, wherein the operations further include terminating the half-authenticated data connection between a client and the management server once the data has been communicated.

15. A system comprising:

a memory to store instructions for half-authentication, and a hardware processor to execute the instructions, wherein the instructions cause the hardware processor to:

deploy a proxy to serve as a representative of a management server, wherein the serve as the representative comprises collect information to monitor and administer a private network, wherein the private network is a private domain;

manage certificate production and distribution costs of the management server by establish a half-authenticated data connection between the proxy and the management server using a client certificate, wherein the establish comprises:

receive the client certificate from the proxy for authenticating the proxy, without the proxy authenticating the management server;

validate the client certificate to authenticate the proxy, the validation of the client certificate comprising validate a cryptographic challenge of a certificate authority by obtaining a public key of the certificate authority and check a signature associated with the public key;

create the half-authenticated data connection with the proxy in response to a successful validation of the client certificate; and communicate data between the proxy and the management server over the half-authenticated data connection in response to a successful validation of the client certificate.

16. The system of claim 15, further comprising:

establish a bidirectional data connection according to a low-level protocol from the client to the management server;

commence a reversed Secure Sockets Layer ("SSL") protocol negotiation, wherein the management server takes a role according to an SSL client and the client takes a role according to an SSL server;

transmit the certificate from the client to the management server in the reversed SSL protocol negotiation; and complete the reversed SSL protocol negotiation.

17. The system of claim 15, wherein to communicate comprises the hardware processor to transmit a request from a client to the management server, the request is to obtain system information including at least one of a system uptime, a system load average, a system free memory, a system network utilization, or a system disk utilization.

18. The system of claim 17, wherein the request is to obtain system hardware characteristic including at least one of an installed processor identification, an installed memory size, a network hardware identifier, or a disk identifier.

19. The system of claim 17, wherein the request is to change a status of the management server including one of a system reset or a system shutdown.

20. The system of claim 15, wherein the half-authentication data connection comprises an anonymous data connection between a client and the management server in which at least the management server remains anonymous.

21. The system of claim 15, wherein the hardware processor is further to terminate the half-authenticated data connection between a client and the management server once the data has been communicated.

* * * * *